US007347139B2

(12) United States Patent
Cheung et al.

(10) Patent No.: US 7,347,139 B2
(45) Date of Patent: Mar. 25, 2008

(54) FOOD PURIFIER

(75) Inventors: George F. Cheung, La Mirada, CA (US); June Tok Lee, Shenzhen (TW); Wai Kay Choi, Fo Tan (HK); Kong Ping Lau, Kowloon (HK)

(73) Assignee: Intelli Innovations Ltd., Kwun Tong, Kowloon (HK)

( * ) Notice: Subject to any disclaimer, the term of this patent is extended or adjusted under 35 U.S.C. 154(b) by 680 days.

(21) Appl. No.: 10/831,014

(22) Filed: Apr. 22, 2004

(65) Prior Publication Data

US 2005/0238776 A1 Oct. 27, 2005

(51) Int. Cl.
*A23L 1/00* (2006.01)

(52) U.S. Cl. ............................ 99/468; 99/467; 99/473

(58) Field of Classification Search .......... 99/467-472, 99/485, 483, 561, 536, 482, 352-355, 473; 422/20, 28, 30, 295, 297, 186.07, 186.19, 422/198

See application file for complete search history.

(56) References Cited

U.S. PATENT DOCUMENTS 3,549,528 A * 12/1970 Armstrong .................. 210/760
3,719,017 A * 3/1973 Shapiro et al. ............... 53/431
3,751,225 A * 8/1973 Karlson ...................... 422/116
4,517,159 A * 5/1985 Karlson ...................... 422/20
5,120,512 A * 6/1992 Masuda ...................... 422/297
2002/0150500 A1* 10/2002 Carman et al. ............... 422/28
2004/0184949 A1* 9/2004 McEllen ........................ 422/4
2006/0130491 A1* 6/2006 Park et al. .................... 62/3.6

* cited by examiner

*Primary Examiner*—Timothy F. Simone
(74) *Attorney, Agent, or Firm*—Raymond Y. Chan; David and Raymond Patent Firm

(57) ABSTRACT

A food purifier includes a supporting base having an air outlet, an ozone generator supported in the supporting base for generating a flow of ozone mixing of air to form an airflow towards the air outlet, and a food container, which is supported on the supporting base, having an air inlet and a receiving cavity for containing the water and foods therein. A releasable valve is sealedly mounted at the air outlet of the supporting base for allowing the airflow to pass into the receiving cavity of the food container through the air inlet and for blocking the water from entering into the supporting base. An air dispenser is disposed at a bottom side of the receiving cavity of the food container for diffusing the airflow from the releasable valve to the water so as to guide the airflow in contact with the food.

23 Claims, 11 Drawing Sheets

FOOD PURIFIER

BACKGROUND OF THE PRESENT INVENTION

1. Field of Invention

The present invention relates to food cleaning apparatus, and more particularly to a food purifier which employs with ozone technology to kill the microorganism and remove the chemical substance, such as preservative and pesticide, so as to sterilize the food.

2. Description of Related Arts

Nowadays, ozone is considered as one of the most effective disinfectants for purification in food processing. Ozone is called activated oxygen and contains three atoms of oxygen instead of the normal oxygen having two oxygen atoms that we breathe.

There are basically two methods of producing ozone, which are ultra-violet and corona discharge. Most ozone generator uses the corona discharge method, simulating in essence, lightning. Ozone generator utilizing UV is hard to find because it is inefficient and unreliable, and very costly to service compared to the corona discharge equipment.

The theory of the corona discharge is to ionize the air to produce ozone. Accordingly, an electron reacts with oxygen to break down the oxygen into the oxygen atom wherein the oxygen atom is then reacted with another oxygen to form ozone.

Accordingly, it is known that ozone is one of the strongest oxidizer in the world wherein ozone is commonly used for disinfecting, detoxification, and air deodorization, as well as food preservation. In addition, ozone is the safest and most natural purification and disinfection agent for fresh produce and water treatment. It is the strongest and most ideal antimicrobial, bactericide, fungicide, and deodorizer, detoxifying agent, germicide, sanitizer, sterilizer, and vermicide agent. Thus, many researches illustrate the use of ozone can extend the food product storage life.

Because ozone is only partially soluble in water, special gas/liquid contacting and related equipment are required to provide its maximum cost-effectiveness in a safe manner. In water, ozone can be readily decomposed to produce the hydroxyl free radical (HO), which is a much stronger oxidizing agent than is molecular ozone, allowing certain chemical pollutants to be oxidized to destruction that molecular ozone cannot oxidize effectively. Yet the hydroxyl free radical has only a microsecond half-life, and thus is not as effective for controlling microorganisms as is molecular ozone.

SUMMARY OF THE PRESENT INVENTION

A main object of the present invention is to provide a food purifier which employs with ozone technology to kill the microorganism and remove the chemical substance, such as preservative and pesticide, so as to sterilize the food.

Another object of the present invention is to provide a food purifier, which comprises an ozone generator for producing a flow of ozone mixing with a flow of air to form a disinfection agent for freshening the food.

Another object of the present invention is to provide a food purifier, wherein a releasable valve for allowing the ozone passing into the container so as to prevent the water entering into the supporting base which will damage the ozone generator.

Another object of the present invention is to provide a food purifier, which further comprises an air dispenser for effectively dispensing the ozone to create an optimum washing action to effectively sterilize the food. In other words, the food purifier, which is embodied a household appliance, can efficiently sterilize the food in comparison with a conventional food purifier that the ozone is guided to directly flow into the container so as to limit the contacting area between the ozone and the foods.

Another object of the present invention is to provide a food purifier, wherein the ozone occurs naturally in the environment in such a manner the present invention substantially purities the food by removing the harmful substance. In other words, the food purifier of the present invention is safe to use because no artificial or chemical substance is added into the airflow through the purification process.

Accordingly, in order to accomplish the above objects, the present invention provides a food purifier for sterilizing foods in water, comprising:

a supporting base having an air outlet;

an ozone generator supported in the supporting base for generating a flow of ozone mixing of air to form an airflow towards the air outlet;

a food container, which is supported on the supporting base, having an air inlet communicating with the air outlet of the supporting base and a receiving cavity for containing the water and foods therein;

a releasable valve sealedly mounted at the air outlet of the supporting base for allowing the airflow to pass into the receiving cavity of the food container through the air inlet and for blocking the water from entering into the supporting base; and an air dispenser disposed at a bottom side of the receiving cavity of the food container for diffusing the airflow from the releasable valve to the water so as to guide the airflow in contact with the food.

These and other objectives, features, and advantages of the present invention will become apparent from the following detailed description, the accompanying drawings, and the appended claims.

DETAILED DESCRIPTION OF THE PREFERRED EMBODIMENT

Figure 1:
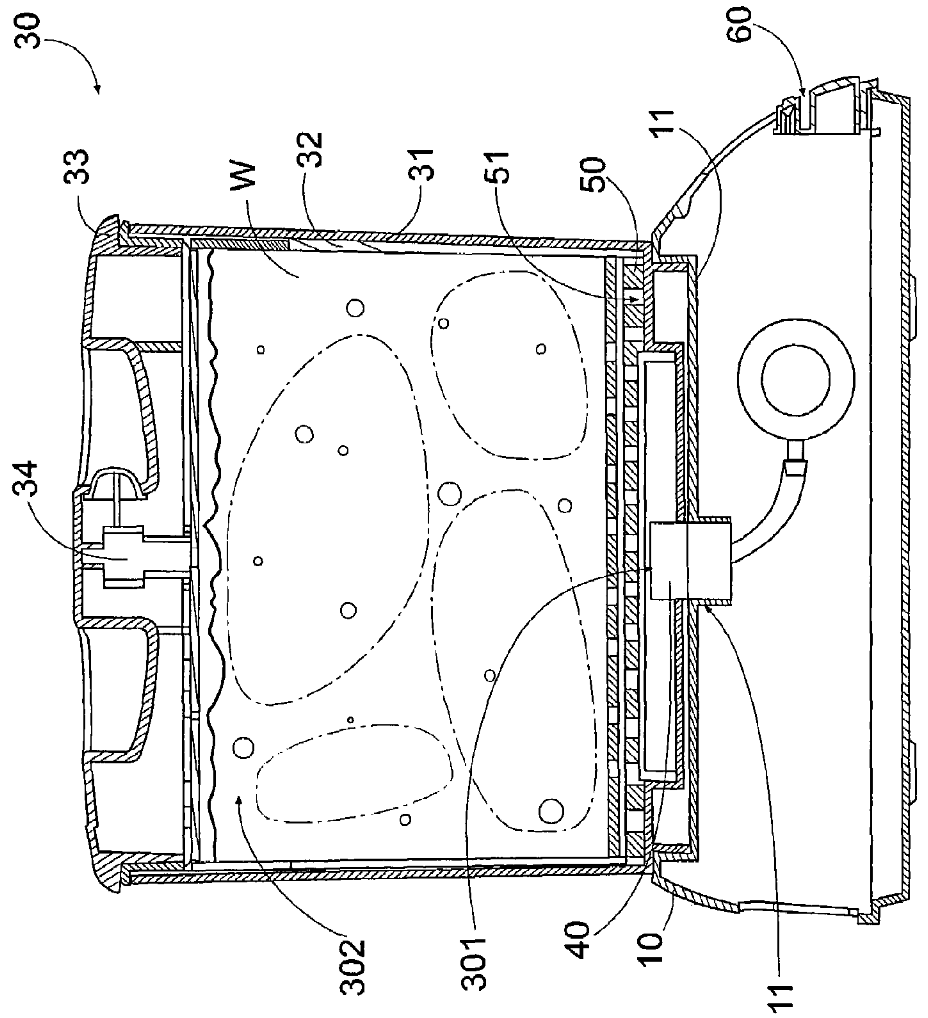
FIG. 1 is a sectional view of a food purifier according to a preferred embodiment of the present invention.

Referring to FIG. 1 to FIG. 6 of the drawings, a food purifier for sterilizing foods in a water according to a preferred embodiment of the present invention is illustrated, wherein the food purifier, which is embodies as a household appliance, comprises a supporting base 10 having an air outlet 11, an ozone generator 20 supported in the supporting base 10 for generating a flow of ozone mixing of air to form an airflow A towards the air outlet 11.

The food purifier further comprises a food container 30, a releasable valve 40, and an air dispenser 50.

The food container 30, which is supported on the supporting base 10, has an air inlet 301 communicating with the air outlet 11 of the supporting base 10 and a receiving cavity 302 for containing the water and foods therein.

The releasable valve 40 is sealedly mounted at the air outlet 11 of the supporting base 10 for allowing the airflow A to pass into the receiving cavity 302 of the food container 30 through the air inlet 301 and for blocking the water W from entering into the supporting base 10.

The air dispenser 50 is disposed at a bottom side of the receiving cavity 302 of the food container 30 for diffusing the airflow A from the releasable valve 40 to the water W so as to guide the airflow A in contact with the food. In other words, the present invention can effectively distribute the ozone to create an optimum washing action to clean the food.

According to the preferred embodiment, the supporting base 10 further has a top platform 12 to support the food container 30 thereon wherein the air outlet 11 is formed on the top platform 12 while the ozone generator 20 is mounted in the supporting base 10 underneath the top platform 12.

Figure 3:
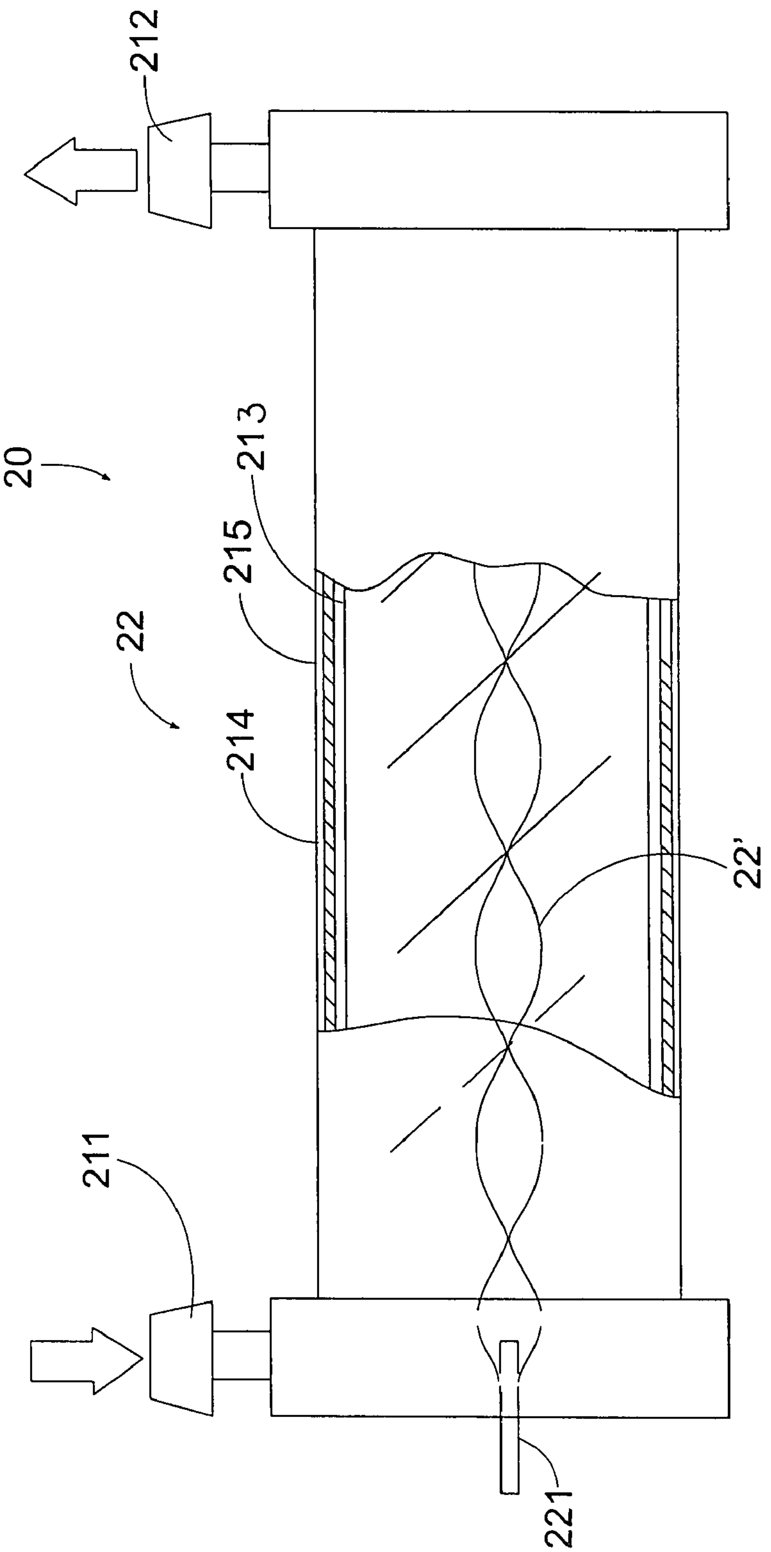
FIG. 3 is a sectional view of an ozone generator of the food purifier according to the above preferred embodiment of the present invention.

The ozone generator 20, according to the preferred embodiment, is a corona discharge ozone generator. As shown in FIG. 3, the ozone generator 20 comprises a tubular ionizing channel 21 and an ionizing element 22 disposed therewithin wherein the ionizing channel 21 has an air sucking end 211 for sucking a surrounding air into the ozone channel 21 via a pumping device and an air discharging end 212 extended to the air outlet 11 of the supporting base 10 in such a manner that the ionizing element 22 is capable of ionizing the air to form the flow of ozone while the air passes from the air sucking end 211 of the ionizing channel 21 to the air discharging end 212 thereof.

Accordingly, the ionizing element 22, which is embodied as a stainless steel blush, has a terminal 221 arranged to electrically connect to a power source wherein the ionizing element 22 has an ionizing voltage (2000 to 15000V) to ionize the air. In addition, the ionizing channel 21, which is preferably constructed to have three layers, comprises an inner crystal tube 213, an outer insulating layer 214, and a reinforcing layer 215, which is made of rigid material such as brass or aluminum, disposed between the crystal tube 213 and the insulating layer 214. According to the preferred embodiment, the ionizing element 22 is embodied as a needlepoint ionization element to generate ozone, which not only is more efficient and less prone to corrosion but also produces less nitrogen oxide that is undesirable by-product of the corona discharge process.

The food container 30 comprises an outer bucket 31 defining the air inlet 301 at a bottom side thereof and an inner drainer 32, having a plurality of draining slots 321, detachably disposed in the outer bucket 31 to define the receiving cavity 302 within the inner drainer 32 wherein the food container 30 is capable of containing the water W and the foods within the receiving cavity 302 of the inner drainer 32, in such a manner that when the inner drainer 32 is slidably lifted up from the outer bucket 31, the inner drainer 32 is capable of retaining the foods therewithin while the water W is drained to the outer bucket 31 through the draining slots 321.

Figure 2:
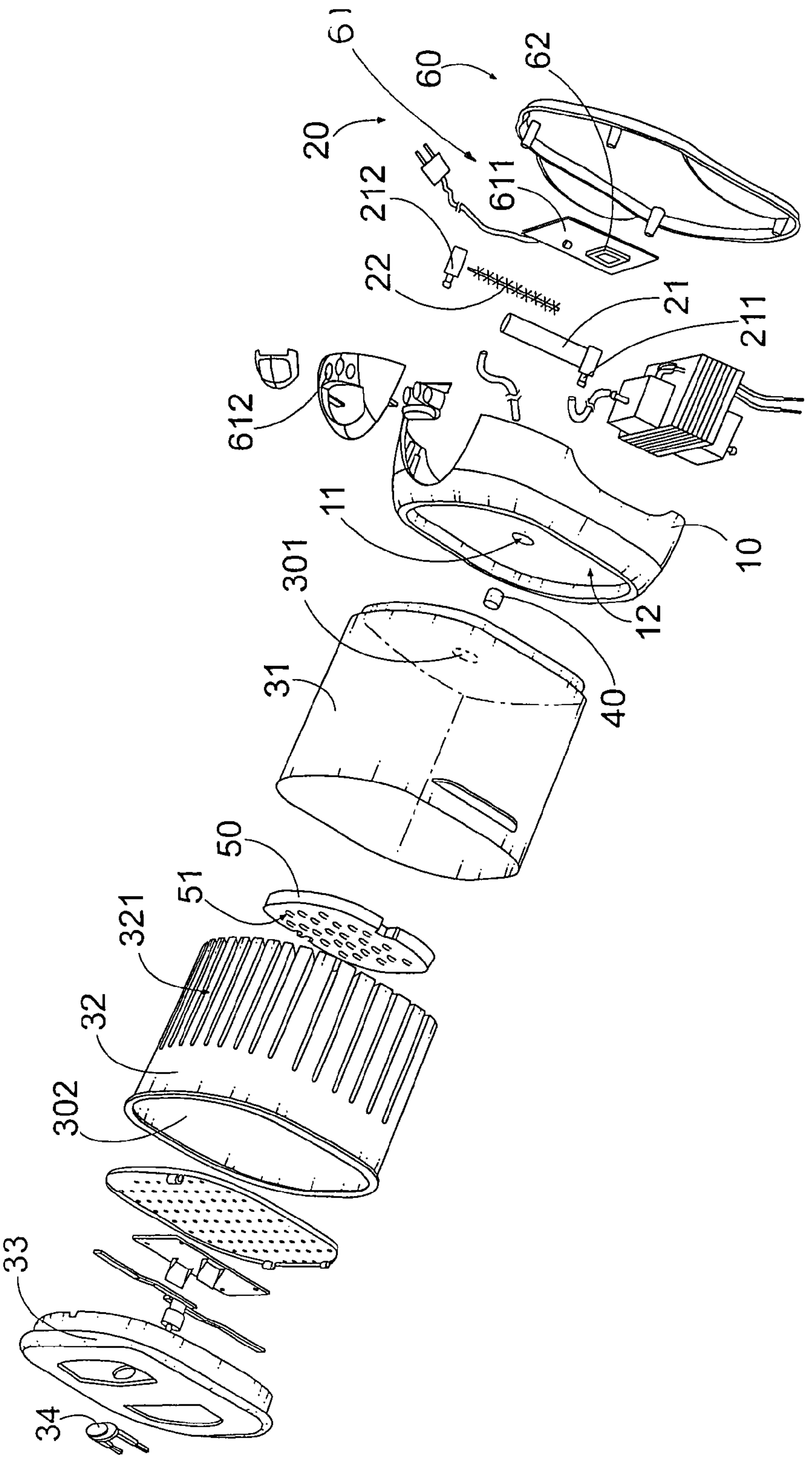
FIG. 2 is an exploded perspective view of the food purifier according to the above preferred embodiment of the present invention.

As shown in FIG. 2, the food container 30 further comprises a container cover 33 detachably covering on the outer bucket 31 to enclose the receiving cavity 302 and a cover locker 34 mounted at the container cover 33 to lock up the container cover 33 with the outer bucket 31. Accordingly, the container cover 33 is detachably mounted on an opening of the outer bucket 31 to push the food below the water level of the water W within the receiving cavity 302. In other words, the container cover 33 is adapted to keep the food submerged under the water W during the treatment.

The air dispenser 50 is disposed in the receiving cavity 302 at a position between the bottom side of the outer bucket 31 and a bottom side of the inner drainer 32 to cover on the air inlet 301 of the food container 30 so as to hold the air dispenser 50 in position. According to the preferred embodiment, the air dispenser 50 has a plurality of air diffusing holes 51 evenly provided thereon for modifying the airflow A into a bubble form so as to evenly diffuse the airflow A from the air inlet 301 throughout the receiving cavity 302.

Figure 4:
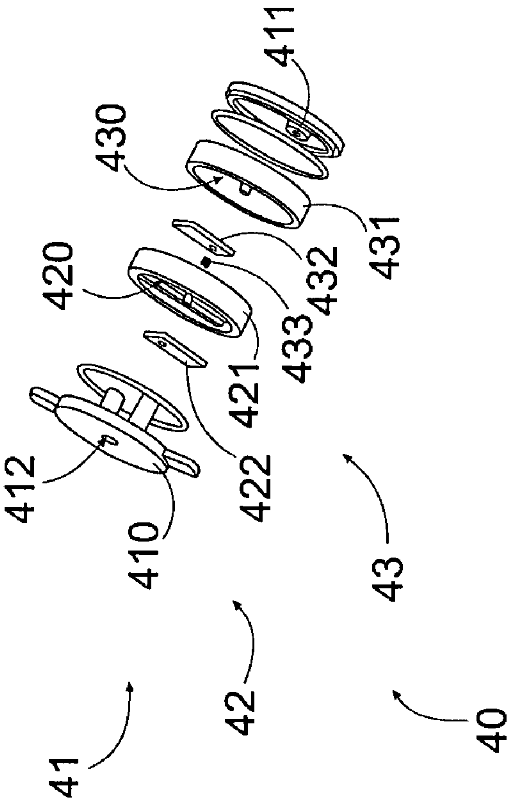
FIG. 4 is an exploded perspective view of a releasable valve of the food purifier according to the above preferred embodiment of the present invention.
Figure 5:
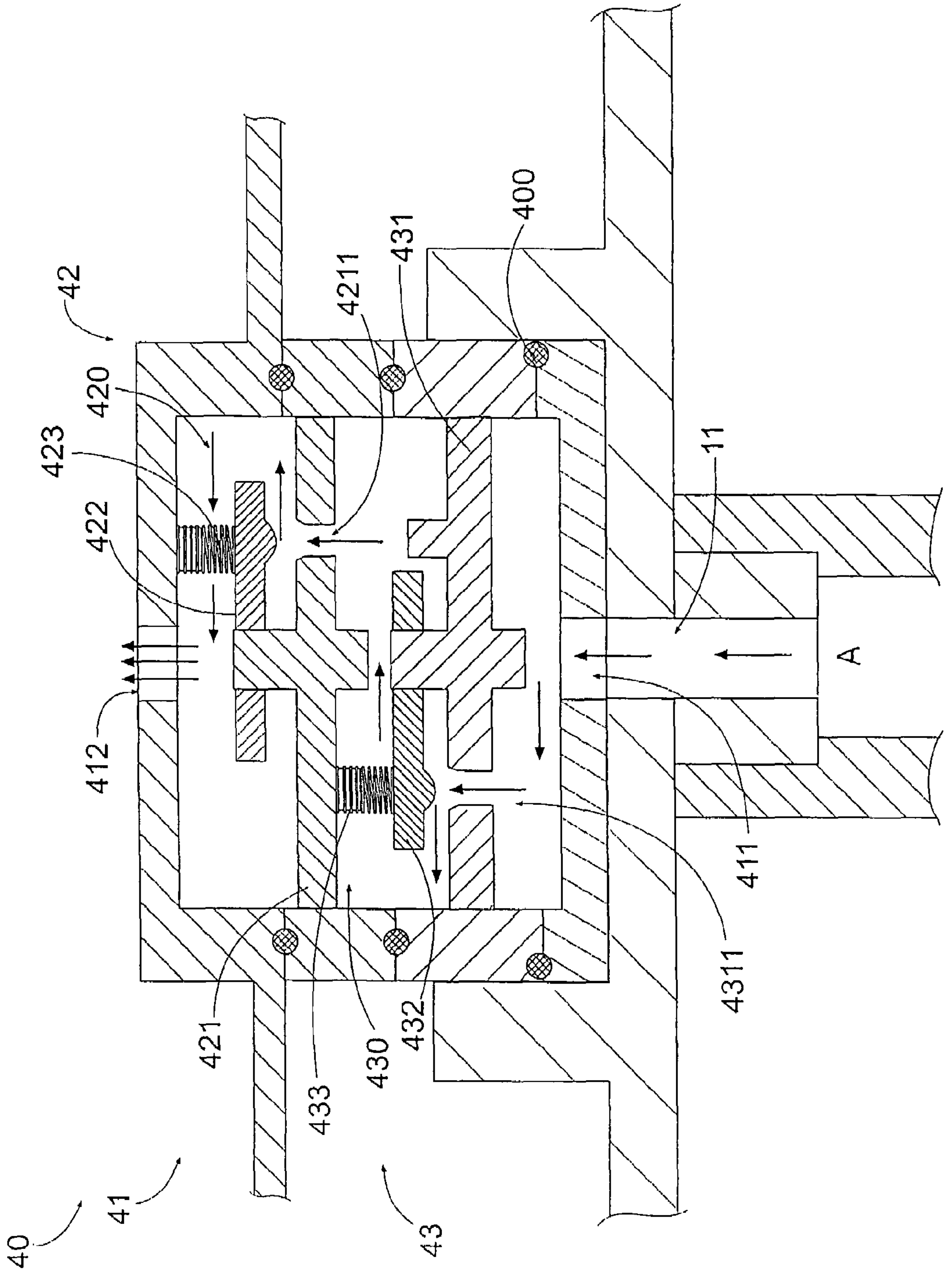
FIG. 5 is a sectional view of the releasable valve of the food purifier according to the above preferred embodiment of the present invention.

As shown in FIGS. 4 and 5, the releasable valve 40 is sealedly mounted at the air outlet 11 of the supporting base 10 via a sealing gasket 400 for preventing the air leakage around the air outlet 11 of the supporting base 10. The releasable valve 40, which is constructed as a double valve configuration, comprises a valve body 41 having a valve inlet 411 communicating with the air outlet 11 of the supporting base 10 and a valve outlet 412 communicating with the air inlet 301 of the food container 30, a first water valve 42 disposed in the valve body 41 to define a first air chamber 420 between a top side of the valve body 41 and the first water valve 42, and a second air valve 43 disposed in the valve body 41 at a position below the first water valve 42 to define a second air chamber 430 between the first water valve 42 and the second air valve 43, wherein the releasable valve 40 is arranged for guiding the airflow A to pass from the valve inlet 411 to the valve outlet 412 through the second air chamber 430 of the second air valve 43 and the first air chamber 420 of the first water valve 42.

Accordingly, the first water valve 42 comprises a water sealing platform 421 having an air passage 4211 communicating the first air chamber 420 with the second air chamber 430, and a first valve stopper 422 sealedly mounted on the water sealing platform 421 in a vertically movable manner to seal at the air passage 4211 of the water sealing platform 421 for preventing the water W entering into the second air chamber 430 through the air passage 4211.

The first water valve 42 further comprises a resilient member 423 disposed within the first air chamber 420 for applying an urging force on the first valve stopper 422 to retain the first valve stopper 422 in position to sealedly close the air passage 4211. The resilient member 423, according to the preferred embodiment, is a compression spring having two ends biasing against the top side of the of the valve body 41 and a bottom side of the water sealing platform 421 respectively to normally push the first valve stopper 422 downwardly so as to sealedly close the air passage 4211.

Accordingly, the first water valve 42 is adapted for allowing a small amount of the water W in the food container 30 entering into the first air chamber 420 to push the first valve stopper 422 to sealedly close at the air passage 4211 of the water sealing platform 421 by means of water pressure. Therefore, once the water W enters into the first air chamber 420, the first valve stopper 422 sealedly closes the air passage 4211 so as to prevent the water W further enters into the second air chamber 430 through the air passage 4211.

The second air valve 43 comprises an air sealing platform 431, having an air exit 4311 communicating the air outlet 11 of the supporting base 10 with the second air chamber 430, defining the second air chamber 430 between the air sealing platform 431 and the water sealing platform 421, and a second valve stopper 432 sealedly mounted on the air sealing platform 431 in a vertically movable manner to seal at the air exit 4311 of the air sealing platform 431 for blocking the airflow A entering into the second air chamber 430 through the air exit 4311.

The second air valve 43 further comprises a resilient element 433 disposed within the second air chamber 430 for applying an urging force on the second valve stopper 432 to retain the second valve stopper 432 in position to sealedly close the air exit 4311. The resilient element 433, according to the preferred embodiment, is a compression spring having two ends biasing against a bottom side of the water sealing platform 421 and the second valve stopper 432 to normally push the second valve stopper 432 downwardly so as to sealedly close the air exit 4311. It is worth to mention that once the air pressure of the airflow A is larger than the downward pushing force of the resilient element 433, the airflow A will push the second valve stopper 432 upwardly to allow the airflow A releasing into the second air chamber 430.

In other words, when the airflow A enters the valve inlet 411 through the air outlet 11 of the supporting base 10, the airflow A pushes the second valve stopper 432 upwardly and enters into the second air chamber 430 through the air exit 4311. Then, the airflow A within the second air chamber 431 pushes the first valve stopper 422 upwardly and enters into the first air chamber 420 through the water passage 4211. At the same time, the upward pushing force of the airflow A will compress the resilient element 433.

The airflow within the first air chamber 420 will be released to the receiving cavity 302 through the valve outlet 412 while the water W within the receiving cavity 302 will enter into the first air chamber 420. Due to the water pressure, the water W entering into the first air chamber 420 will push the first valve stopper 422 downwardly to close the water passage 4211 so as to block the airflow A entering into the first air chamber 420 and to block the water W entering into the second air chamber 430 through the water passage 4211. At the same time, the downward pushing force of the resilient element 433 will push the second valve stopper 432 downwardly to close the air exit 4311. Once the air pressure within the second air chamber 430 is high enough to push the second air valve stopper 432 upwardly, the airflow A will enter into the first air chamber 420 again. It is worth to mention that the double valve design (the first air valve 42 and the second air valve 43) of the releasable valve 40 substantially minimizes the water W leaking from the food container 30 to the supporting base 10, so as to prevent the damage of the components within the supporting base 10 by the water W.

As shown in FIG. 2, the food purifier further comprises a control unit 60 electrically connected with the ozone generator 20 to operate the ozone generator 20 wherein the control unit 60 comprises means 61 for operating the ozone generator 20 in an on and off manner and a time switch 62 electrically connected with the operating means 61 to selectively operate the ozone generator 20 for a predetermined time period.

The operating means 61 comprises an operating circuit 611 for electrically connecting with a power source and at least a button switch 612 to selectively switch the ozone generator 20 in an on and off manner. Accordingly, the operating circuit 611 is adapted for controlling treatment time for the food through the ozone purification process via the time switch 62 and for controlling the ozone level for the food via the button switch 612. In other words, the user is able to selectively adjust the amount of ozone in the airflow A with respect to the air for purifying different foods.

The time switch 62 is built-in with the operating circuit 611 in such a manner that the user is able to set the time switch 62 as a timer to operate the ozone generator 20 within a predetermined treatment time period.

Figure 6:
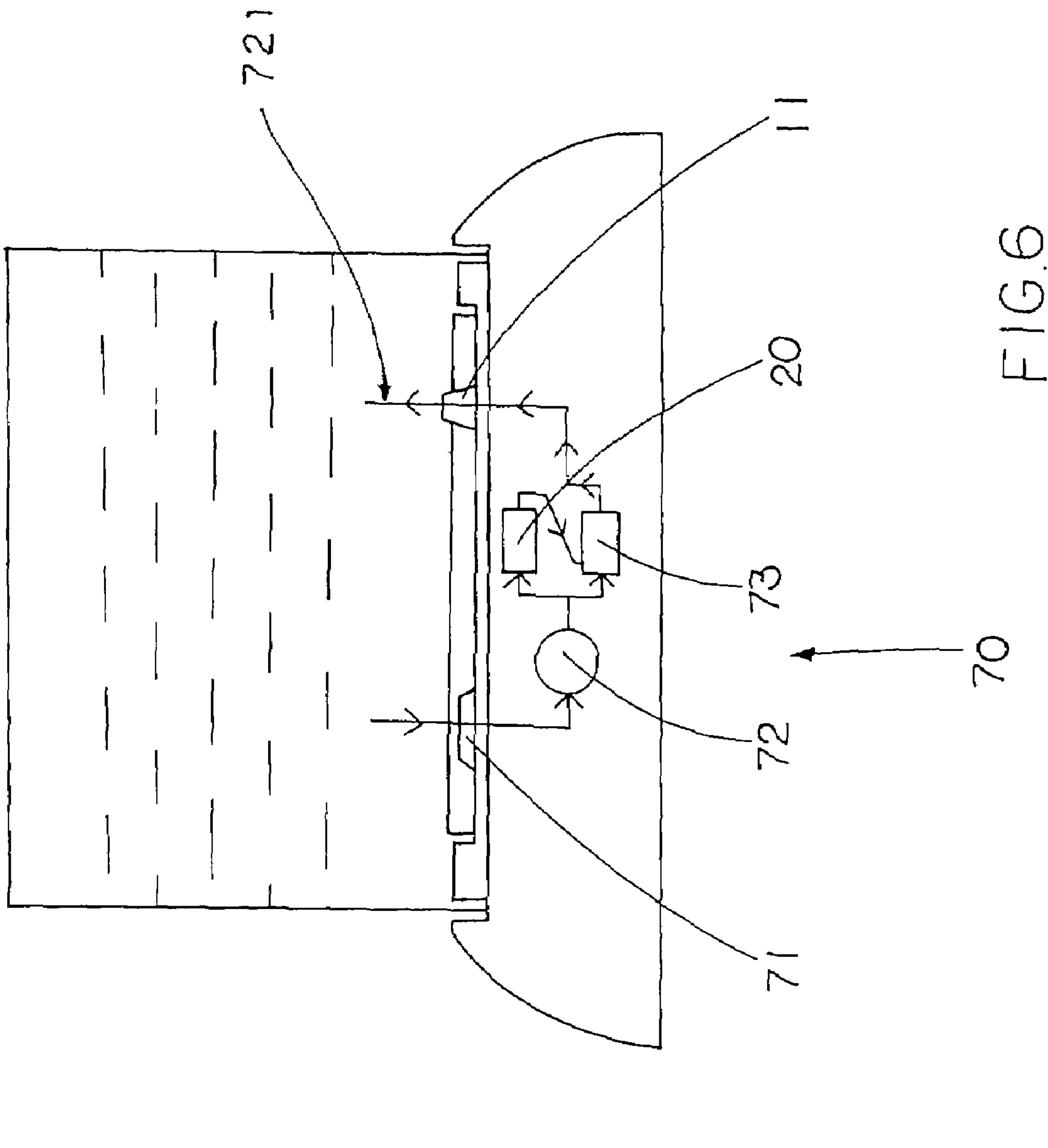
FIG. 6 is a sectional view of a food purifier according to a second preferred embodiment of the present invention.

Referring to FIG. 6 of the drawings, the food purifier for sterilizing foods in water according to a second preferred embodiment of the present invention is illustrated, wherein the food purifier further comprises a water cycling system 70 having a water inlet 71 provided at the supporting base 10 for allowing the water reserved in the food container to flow in therethrough, a pump 72 for generating a circulation route 721 between the water inlet 71 and outlet 11, and an injector 73 supported at the supporting base 10 to be located on the circulation route 721 for mixing the water from the water inlet 71 with the ozone from the ozone generator 20 to form an ozonated water flowing in the circulation route 721 to be returned back to the food container 30 through the outlet 11.

Here, the pump 72 is adaptive for siphoning the water from the food container 30 through the water inlet 71. Accordingly, the circulation route 721 could be embodied as a water transfer conduit for carrying the water flowing in the circulation route 721 from the water inlet 71 to the outlet 11 so as to circulate the water in the food container 30 from time to time. Meanwhile, the injector 73 is of Venturi mode for mixing and dissolving the ozone into water.

As shown in FIG. 6 of the drawings, the pump 72 is positioned in a place between the water inlet 71 and the injector 73 on the circulation route 721 so as to guide water from the water inlet 71 through the injector 73 to be ozonated therein. It is seen that the 721 is adaptive to in fluid communication with the water inlet 71, the pump 72, the injector 73, and the outlet 11 so as to provide a passage for circulating the water in the food container 30. As a result, water flow from the water inlet 71 could be mixed and dissolved with ozone from the ozone generator 20 in the injector 73 to form ozonated water. Afterwards, the ozonated water will be vented towards to the outlet 11 to circulate the water reserved in the food container 30.

According to the second preferred embodiment of the present invention, the ozone generator 20 is embodied as the corona discharger style ozone generator. The ozone generator 20 here is adaptive to convert an oxygen gas or a gas rich in oxygen into an ozone gas. Commonly, the ozone generator 20 comprises two electrodes 21, 22.

As known in the arts, the conventional arrangement comprises two electrodes, which are generally separated by a dielectric. Between at least one of the electrodes and the dielectric is provided a gas gap through which is passed the oxygen-containing gas. An a.c. voltage impressed from the outside on the electrode is increased to such an extent that a discharge occurs between the dielectric and at least one of the electrodes. In the discharge oxygen molecules are split off and atomic oxygen is formed. Ozone is generated through the reaction of atomic oxygen with molecular oxygen.

In other words, ozone is produced by letting oxygen, or a gas rich in oxygen, pass through an electrical discharge. In other words, an oxygen-rich gas is thereby allowed to flow through a chamber in an ozone generator, said chamber being defined either by two co-axial tubes, or a series of plates, between which tubes or plates an electrical discharge is taking place to produce ozone.

Figure 8:
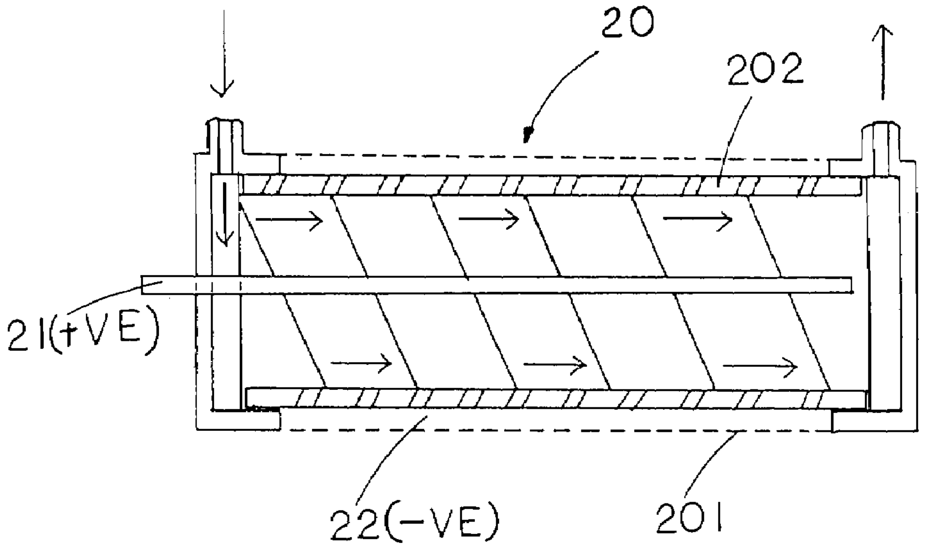
FIG. 8 illustrates a first mode of ozone generator according to the second preferred embodiment of the present invention.

Referring to the FIG. 8, a first ozone generator 20 in which oxygen in the form of oxygen gas or a gas rich in oxygen is converted into ozone is illustrated. This mode of ozone generator is defined by a co-axial tube having an outer insulating layer 201 and at least one delimiting surface 202 made of a dielectric material adapted for separating two electrodes 21, 22 to generate a corona during the discharge between two electrodes 21, 22 so as to convert oxygen gas into ozone gas.

Figure 9:
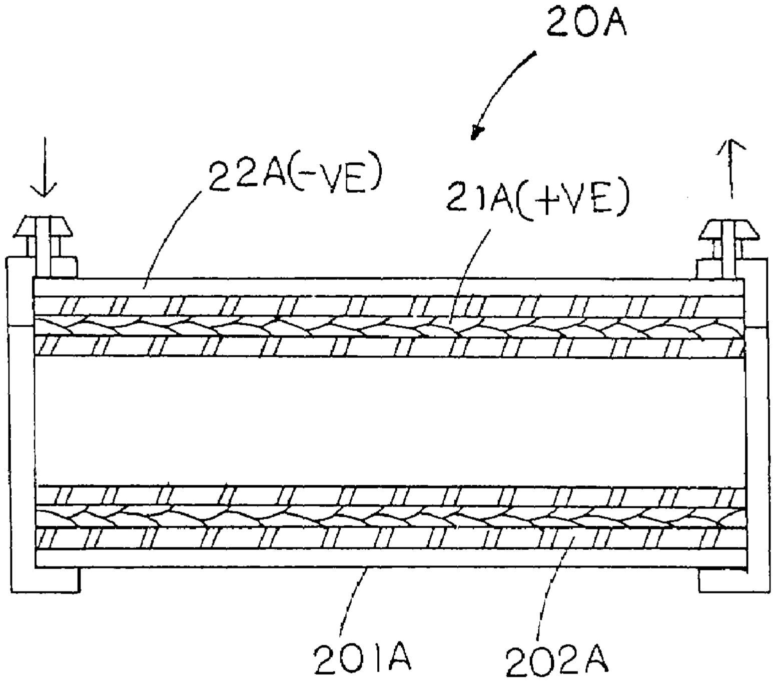
FIG. 9 illustrates a second mode of ozone generator according to the second preferred embodiment of the present invention.

Referring to the FIG. 9, a second ozone generator 20A in which oxygen in the form of oxygen gas or a gas rich in oxygen is converted into ozone is illustrated. This mode of ozone generator is defined by a co-axial tube having an outer layer 201A made of stainless steel, two layers of dielectric layer 202A made of glass type materials, and a layer of electrode layer sandwiched between said two dielectric layers 202A adapted for separating two electrodes 21A, 22A to generate a corona during the discharge between two electrodes 21A, 22A so as to convert oxygen gas into ozone gas.

Figure 10:
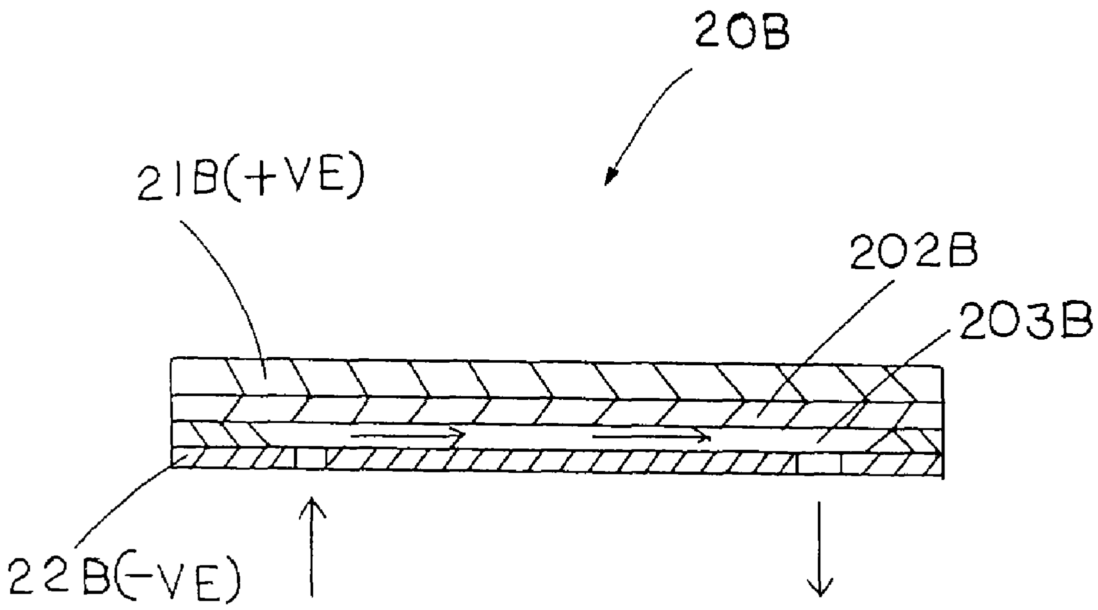
FIG. 10 illustrates a third mode of ozone generator according to the second preferred embodiment of the present invention.

Referring to the FIG. 10, a third ozone generator 20B in which oxygen in the form of oxygen gas or a gas rich in oxygen is converted into ozone is illustrated. This mode of ozone generator is defined by a plurality of plates, wherein two electrodes 21B, 22B are separated by a dielectric layer 202B made of ceramic. Meanwhile, a gas chamber 203B is defined between one of the electrodes 21B made of stainless steel and the dielectric layer 202B for ensuring oxygen-containing gas pass through to be converted into ozone.

Figure 7:
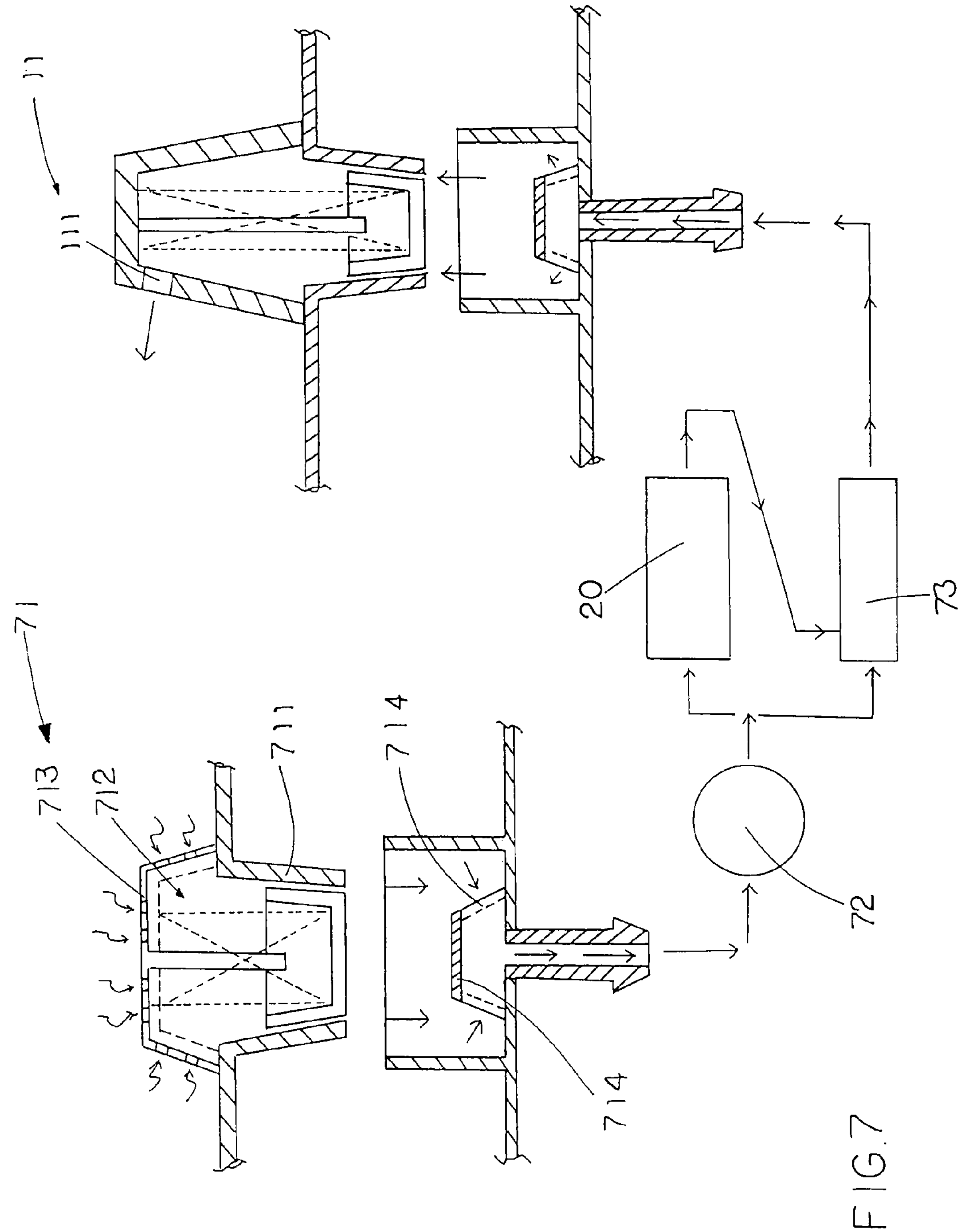
FIG. 7 is a schematic view of a food purifier according to the second preferred embodiment of the present invention.

As shown in FIG. 7, the water inlet 71 is tube shaped having a water inlet body 711, wherein a water flowing cavity 712 is defined within the water inlet body 711 for ensuring a water flow therein. The water inlet body 711 further comprises an enlarged top end disposed within the container for directly contacting with the water reserved in the container 30, and an elongated portion which is adaptive to be inserted into the supporting base 10 for flowing the water into the circulation route 721 supported by the supporting base 10. Here, a cap 713 is covered on the enlarged top end whereon a plurality of perforated holes is defined for ensuring the water leaking in from the container 30. Meanwhile, a metal mesh 714 is disposed within the water flowing cavity 712 as a filter for blocking the impurities of the water reserved in the food container 30 flowing into the circulation route 721.

Accordingly, the air outlet 11 according to the second embodiment of the present invention is designed as a similar structure as the water inlet 71. The only difference is that a water flowing slut 111 is defined on the cap of the air outlet 11 instead of a plurality of perforated holes provided on the water inlet 71.

Figure 11:
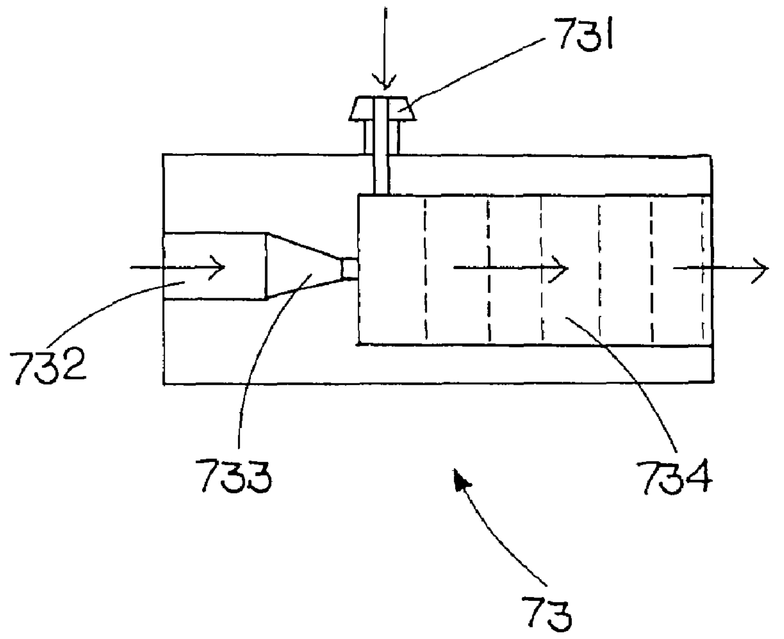
FIG. 11 illustrates a first mode of venturi injector according to the second preferred embodiment of the present invention.
Figure 12:
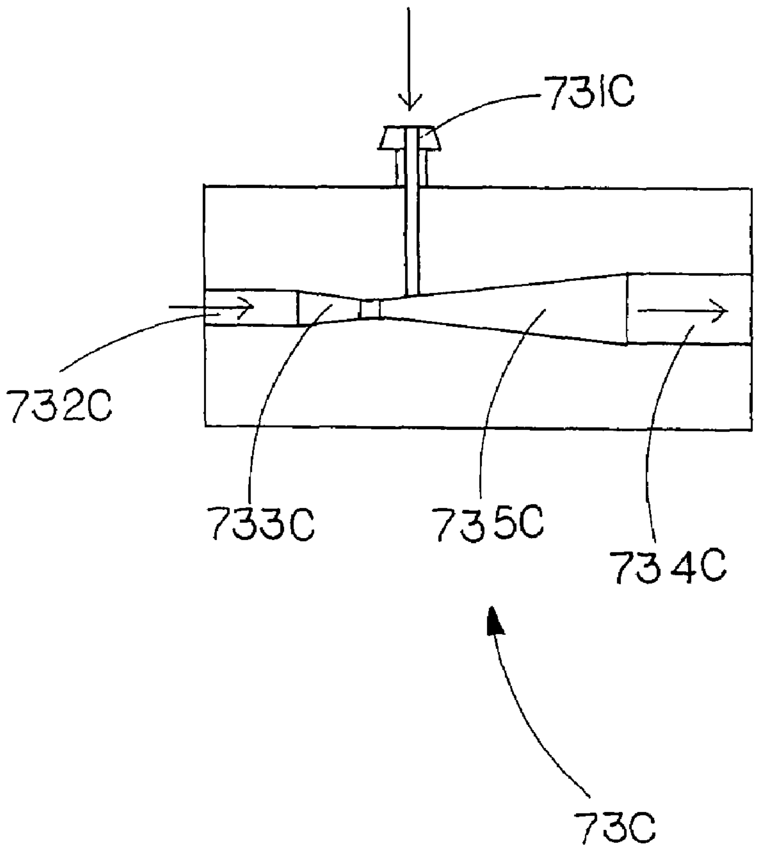
FIG. 12 illustrates a second mode of venturi injector according to the second preferred embodiment of the present invention.
Figure 13:
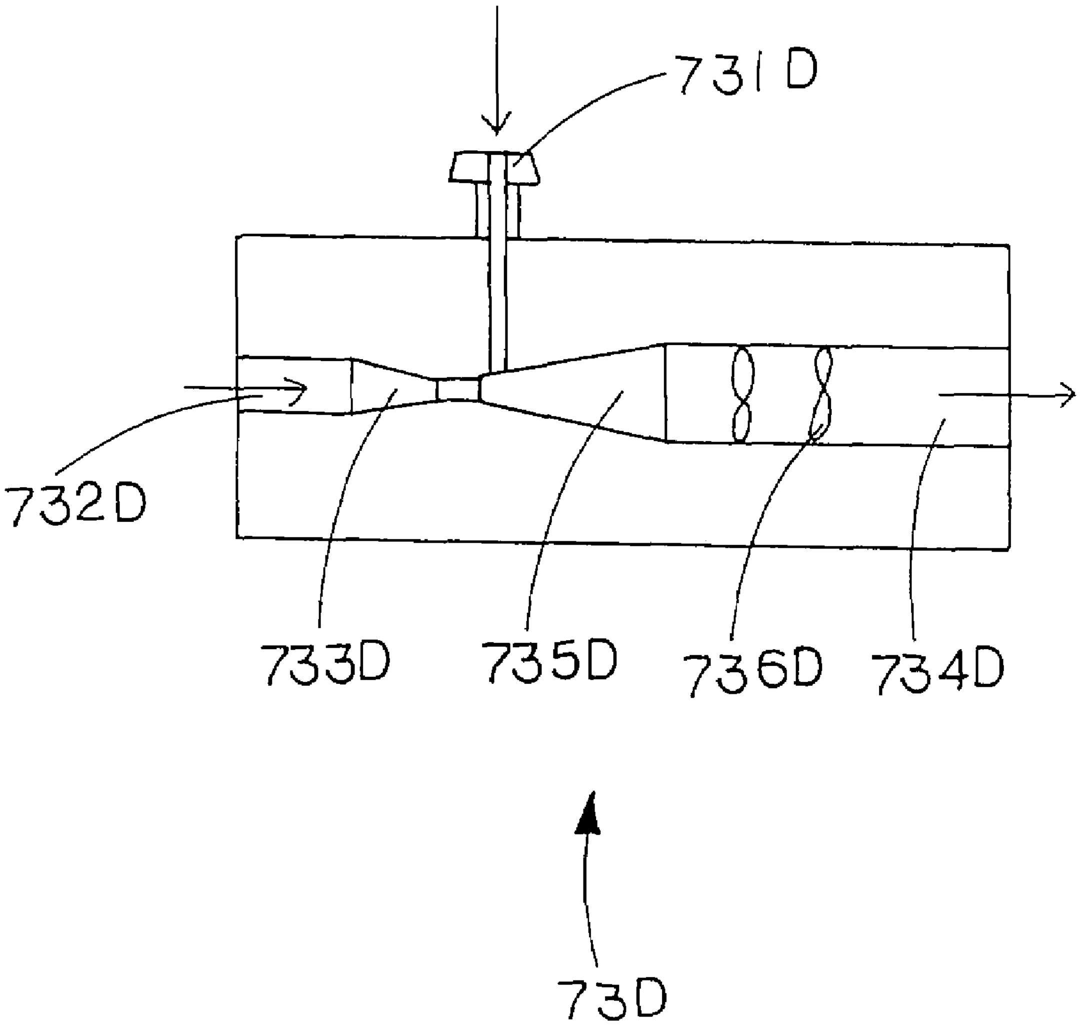
FIG. 13 illustrates a second mode of venturi injector according to the second preferred embodiment of the present invention.

As shown in FIG. 11 to FIG. 13, the injector 73 has a first inlet 731 communicated the ozone generator 20 for sucking in ozone gas, a second inlet 732 communicated with the circulation route 721 for introducing the water flow to pass through said injector 73 for mixing and dissolving the ozone from the ozone generator 20 into the water flow to generate a ozonated water, and a jet nozzle 733 for venting said ozonated water from said injector 73

Meanwhile, the ozone generator 20 comprises a discharging end 212 for venting the ozone to the injector 73. As a result, an ozonated water is produced on-site by injector 73 wherein water flow in the circulation route 721 is mixed with ozone to be ozonated.

In other words, the injector 73 is capable of producing ozonated water by mixing and dissolving the ozone introduced from the ozone generator 20. Meanwhile, the pump 72 is provided for circulating the ozonated water generated from the injector 73 within the circulation route 721 thereby refreshing the water reserved in the container 30.

Referring to the FIG. 11, a first mode of injector 73 is illustrated. A jet nozzle 733 is provided on the second inlet 732 to create some negative pressure thereby forming jetted water, and the ozone gas is sucked from the first inlet 731 into a mixing chamber 734 of injector 73 from the second inlet 732. As a result, the ozone gas is rapidly mixed and dissolved into the jetted water inside the injector 73. Here, the mixing chamber 734 is tubular shaped cavity wherein a plurality of metal mesh is disposed for facilitating the mixing process between the ozone gas and jetted water.

Referring to the FIG. 12, a second mode of injector 73C is illustrated. A jet nozzle 733C is provided on the second inlet 732C to create some negative pressure thereby forming jetted water, and the ozone gas is sucked from the first inlet 731C into a mixing chamber 734C of the injector 73C. As a result, the ozone gas is rapidly mixed and dissolved into the jetted water inside the injector 73C. Here, the mixing chamber 734C is a cone shaped cavity wherein a second jet nozzle 735C is defined on the inner side of the mixing chamber 734C to be aligned with the jet nozzle 733C to generate some turbulent jet water thereby facilitating the mixing process between the ozone gas and jetted water.

Referring to the FIG. 13, a third mode of injector 73D is illustrated. A jet nozzle 733D is provided on the second inlet 732D to create some negative pressure thereby forming jetted water, and the ozone gas is sucked into a mixing chamber 734D of the injector 73D from the first inlet 731D. As a result, the ozone gas is rapidly mixed and dissolved into the jetted water inside the injector 73D. Here, the mixing chamber 734D is a cone shaped cavity wherein a second jet nozzle 735D is defined on the inner side of the mixing chamber 734D to be aligned with the jet nozzle 733D to generate some turbulent jetted water thereby facilitating the mixing process between the ozone gas and jetted water. Furthermore, a plurality of fan 736D is provided within the mixing chamber 734D to strengthen the mixing process.

It is worth to mention the generator is capable of generating ozone, a pump for circulating the generated ozonated water It is worth to mention that the water W is used in the food purifier of the present invention as a cleaning solution to sterilize the foods with ozone. However, the water W can be simply substituted by other cleaning solutions in order to perform the sterilizing process of the present invention.

Moreover, the foods, which are illustrated in the present invention to be sterilized, can be vegetables, fruits, meats, or seafood.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure form such principles. Therefore, this invention includes all modifications encompassed within the spirit and scope of the following claims.

What is claimed is:

1. A food purifier for sterilizing foods immersed in water, comprising:

a supporting base having an outlet;

a food container, which is supported on said supporting base, having an air inlet communicating with said outlet of said supporting base, and a receiving cavity adapted for containing said water and foods therein;

an ozone generator communicated with said outlet of said supporting base, and arranged to generate a flow of ozone flowing toward said outlet;

a releasable valve sealedly mounted at said outlet for selectively allowing fluid flow between said food container and said supporting base, in such a manner that said releasable valve is arranged to allow said gaseous ozone to flow into said receiving cavity through said air inlet for contacting with said food, while blocking said water from flowing into said supporting base; and an air dispenser disposed at a bottom portion of said receiving cavity of said food container for evenly distributing said ozone coming from said air inlet via said releasable valve over an entirety of said receiving cavity, wherein said ozone in said receiving cavity is arranged to substantially kill microorganism disposed on said food so as to optimally prolong a period by which said food can be kept without significant quality deterioration, said air dispenser having a plurality of air diffusing holes evenly provided thereon for generating said flow of said fluid in an optimally bubble form in said water so as to evenly diffuse said ozone within said receiving cavity, said food container comprising an outer bucket defining said air inlet at a bottom surface thereof, and an inner drainer, having a plurality of through draining slots spacedly formed thereon, slidably disposed within a lower portion of said outer bucket in said receiving cavity, wherein said food container is adapted for containing said water and said foods within said receiving cavity, in such a manner that when said inner drainer is slidably lifted up in said outer bucket, said inner drainer is capable of retaining said foods therewithin while said water is drained out of said inner drainer to said outer bucket via said draining slots.

2. The food purifier, as recited in claim 1, wherein said air dispenser is disposed in said receiving cavity at a position between said bottom side of said outer bucket and a bottom side of said inner drainer to cover on said inlet of said food container so as to hold said air dispenser in position.

3. The food purifier, as recited in claim 1, further comprising a control unit electrically connected with said ozone generator to operate said ozone generator, wherein said control unit comprises means for operating said ozone generator in an on and off manner, and a time switch electrically connected with said operating means to selectively activate said ozone generator to operate for a predetermined time period.

4. The food purifier, as recited in claim 2, further comprising a control unit electrically connected with said ozone generator to operate said ozone generator, wherein said control unit comprises means for operating said ozone generator in an on and off manner, and a time switch electrically connected with said operating means to selectively activate said ozone generator to operate for a predetermined time period.

5. The food purifier, as recited in claim 3, wherein said releasable valve comprises a valve body having a valve inlet communicating with said outlet of said supporting base and a valve outlet communicating with said air inlet of said food container, a first water valve disposed in said valve body to form a first air chamber between a top side of said valve body and said first water valve, and a second air valve disposed in said valve body at a position below said first water valve to form a second air chamber between said first water valve and said second air valve, wherein said releasable valve is arranged for guiding said flow of said fluid to pass from said valve inlet to said valve outlet through said second air chamber of said second air valve and said first air chamber of said first water valve via said second and first air valves respectively.

6. The food purifier, as recited in claim 4, wherein said releasable valve comprises a valve body having a valve inlet communicating with said outlet of said supporting base and a valve outlet communicating with said air inlet of said food container, a first water valve disposed in said valve body to form a first air chamber between a top side of said valve body and said first water valve, and a second air valve disposed in said valve body at a position below said first water valve to form a second air chamber between said first water valve and said second air valve, wherein said releasable valve is arranged for guiding said flow of said fluid to pass from said valve inlet to said valve outlet through said second air chamber of said second air valve and said first air chamber of said first water valve via said second and first air valves respectively.

7. The food purifier, as recited in claim 5, wherein said first water valve comprises a water sealing platform having an air passage communicating said first air chamber with said second air chamber, and a first valve stopper sealedly mounted on said water sealing platform in a vertically movable manner to seal at said air passage of said water sealing platform for preventing said water entering into said second air chamber through said air passage.

8. The food purifier, as recited in claim 6, wherein said first water valve comprises a water sealing platform having an air passage communicating said first air chamber with said second air chamber, and a first valve stopper sealedly mounted on said water sealing platform in a vertically movable manner to seal at said air passage of said water sealing platform for preventing said water entering into said second air chamber through said air passage.

9. The food purifier, as recited in claim 7, wherein said first water valve further comprises a first resilient member disposed within said first air chamber for applying an urging force on said first valve stopper, so as to retain said first stopper in position for sealedly closing said air passage.

10. The food purifier, as recited in claim 8, wherein said first water valve further comprises a first resilient member disposed within said first air chamber for applying an urging force on said first valve stopper, so as to retain said first stopper in position for sealedly closing said air passage.

11. The food purifier, as recited in claim 9, wherein said second air valve comprises an air sealing platform, having an air exit communicating said outlet of said supporting base with said second air chamber, defining said second air chamber between said air sealing platform and said water sealing platform, and a second valve stopper sealedly mounted on said air sealing platform in a vertically movable manner to seal at an air exit of said air sealing platform for blocking said airflow entering into said second air chamber through said air exit.

12. The food purifier, as recited in claim 10, wherein said second air valve comprises an air sealing platform, having an air exit communicating said outlet of said supporting base with said second air chamber, defining said second air chamber between said air sealing platform and said water sealing platform, and a second valve stopper sealedly mounted on said air sealing platform in a vertically movable manner to seal at an air exit of said air sealing platform for blocking said airflow entering into said second air chamber through said air exit.

13. The food purifier, as recited in claim 11, wherein said second air valve further comprises a second resilient element disposed within said second air chamber for applying an urging force on said second valve stopper, so as to retain said second valve stopper in position to sealedly close said air exit.

14. The food purifier, as recited in claim 12, wherein said second air valve further comprises a second resilient element disposed within said second air chamber for applying an urging force on said second valve stopper, so as to retain said second valve stopper in position to sealedly close said air exit.

15. The food purifier, as recited in claim 1, further comprising a water cycling assembly which comprises a water inlet provided at said supporting base for allowing said water reserved in said food container to flow therethrough, a pump for generating a circulation route between said water inlet and said outlet, and an injector supported at said supporting base to be located on said circulation route for mixing said water from said water inlet with said ozone from said ozone generator to form an ozonated water flowing in said circulation route, wherein said ozonated water is arranged to be pumped back to said food container through said outlet.

16. The food purifier, as recited in claim 15, wherein said injector further comprises a first inlet communicated said ozone generator for sucking in said ozone, a second inlet communicated with said circulation route for introducing said water from said water inlet to pass through said injector for mixing and dissolving with said ozone to generate said ozonated water, and a outlet for venting said ozonated water from said injector to said circulation route to return said ozonated water back to said food container through said outlet.

17. The food purifier, as recited in claim 16, wherein said ozone generator comprises a co-axial tube, two electrodes spacedly mounted on said co-axial tube, wherein said co-axial tube has an outer insulating layer and at least one dielectric material layer adapted for separating said two electrodes to generate corona when said two electrodes is discharged so as to generate a flow of said ozone from said ozone generator.

18. The food purifier, as recited in claim 16, wherein said injector further comprises a jet nozzle provided on said second inlet to generate a jetted water flow, and a mixing chamber communicated with said first inlet for sucking said ozone generated by said ozone generator, wherein said mixing chamber is tubular in shape and has a plurality of metal meshes disposed therein such that said ozone is capable of being rapidly mixed and dissolved into said jetted water flow.

19. The food purifier, as recited in claim 17, wherein said injector further comprises a jet nozzle provided on said second inlet to generate a jetted water flow, and a mixing chamber communicated with said first inlet for sucking said ozone generated by said ozone generator, wherein said mixing chamber is tubular in shape and has a plurality of metal meshes disposed therein such that said ozone is capable of being rapidly mixed and dissolved into said jetted water flow.

20. The food purifier, as recited in claim 18, wherein said mixing chamber further comprises a plurality of fans disposed therein for facilitating said ozone being mixed and dissolved into said jetted water.

21. The food purifier, as recited in claim 19, wherein said mixing chamber further comprises a plurality of fans disposed therein for facilitating said ozone being mixed and dissolved into said jetted water.

22. The food purifier, as recited in claim 20, wherein said water inlet further comprises a filter for blocking impurity of said water in said food container into said circulation route through said water inlet.

23. The food purifier, as recited in claim 21, wherein said water inlet further comprises a filter for blocking impurity of said water in said food container into said circulation route through said water inlet.

* * * * *